(12) United States Patent
Kwon et al.

(10) Patent No.: US 11,869,210 B2
(45) Date of Patent: Jan. 9, 2024

(54) METHOD AND DEVICE FOR PROPOSING LOCATION OF DISPLAY DEVICE

(71) Applicant: Samsung Display Co., LTD., Yongin-si (KR)

(72) Inventors: So Young Kwon, Seoul (KR); Woo Young Cheon, Suwon-si (KR); Ja Eun Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 59 days.

(21) Appl. No.: 17/678,957

(22) Filed: Feb. 23, 2022

(65) Prior Publication Data
US 2022/0270284 A1    Aug. 25, 2022

(30) Foreign Application Priority Data
Feb. 24, 2021  (KR) .................. 10-2021-0024838

(51) Int. Cl.
*G06T 7/70*      (2017.01)
*G06V 20/50*    (2022.01)
*G06T 19/00*    (2011.01)

(52) U.S. Cl.
CPC .............. *G06T 7/70* (2017.01); *G06T 19/006* (2013.01); *G06V 20/50* (2022.01)

(58) Field of Classification Search
CPC .......... G06T 7/70; G06T 19/006; G06V 20/50
See application file for complete search history.

(56) References Cited

U.S. PATENT DOCUMENTS

| 2016/0048497 A1 | 2/2016 | Goswami |
| 2023/0128740 A1* | 4/2023 | Hong .................. G06T 19/006 703/1 |

FOREIGN PATENT DOCUMENTS

| CN | 1740809 A | * | 3/2006 | .............. G01S 1/02 |
| CN | 104135656 A | * | 11/2014 | ............. H04N 13/00 |
| CN | 104574386 A | * | 4/2015 | ........... G01C 21/165 |
| JP | 2003186411 A | * | 7/2003 | ............... G09F 9/00 |
| JP | 2013258673 A | * | 12/2013 | .............. H04N 5/64 |
| KR | 101275589 B1 | * | 6/2013 | ......... H04L 12/2834 |
| KR | 1020180044554 A | | 5/2018 | |

\* cited by examiner

*Primary Examiner* — Ryan R Yang
(74) *Attorney, Agent, or Firm* — CANTOR COLBURN LLP

(57) ABSTRACT

A method for proposing a location of a display device, includes: scanning, by an augmented reality device, an indoor space; receiving, by the augmented reality device, viewing environment information including viewing space information, viewing time information and viewing content information to the augmented reality device; and proposing, by the augmented reality device, an optimal location/type of the display device.

19 Claims, 16 Drawing Sheets

METHOD AND DEVICE FOR PROPOSING LOCATION OF DISPLAY DEVICE

This application claims priority to Korean Patent Application No. 10-2021-0024838 filed on Feb. 24, 2021, and all the benefits accruing therefrom under 35 U.S.C. § 119, the content of which in its entirety is herein incorporated by reference.

BACKGROUND

1. Field of the Disclosure

The present disclosure relates to a method for proposing a location of a display device, and a device for proposing a location of a display device.

2. Description of the Related Art

A digital image capturing device such as a mobile terminal equipped with a camera (e.g., a camera phone, a smart phone, etc.), a digital camcorder and a digital camera is ever increasingly used.

Such an image capturing device typically provides a preview function. The preview function refers to a function that displays the images projected on the lens as a series of continuous images in real time so that the user can select among the images by pressing the shutter.

A technology for providing information on an object included in the preview images or an object within a predetermined distance is being developed. Such technology is called augmented reality technology. Augmented reality refers to a reality in which real-world images and information related to the real environment are mixed by inserting the information into the real environment.

Augmented reality allows users to more easily acquire information related to the real world.

A mobile terminal may be connected to a communication network to receive a variety of information. Accordingly, a control unit of the mobile terminal can identify the location of the mobile terminal to indicate information on the location of the mobile terminal.

Such information may be represented as an image or text on the display unit. When such information is displayed to be used as augmented reality, it is possible to provide more intuitive information to the user of the mobile terminal.

As the augmented reality technology is more frequently used, the augmented reality technology finds more and more applications. In particular, a technology has been introduced, which allows consumers to check in advance the arrangement of home appliances or object by placing the home appliances or object in a virtual space of an indoor space even without actually placing them. Therefore, the development of such augmented reality technology is desirable.

SUMMARY

Aspects of the present disclosure provide a method for proposing a location of a display device in order to convince consumers that the proposed display device has good reflection characteristics.

Aspects of the present disclosure also provide a device for proposing a location of a display device in order to convince consumers that the proposed display device has good reflection characteristics.

It should be noted that aspects of the present disclosure are not limited to the above-mentioned aspect; and other aspects of the present disclosure will be apparent to those skilled in the art from the following descriptions.

According to an aspect of the present disclosure, there is provided a method for proposing a location of a display device, including: scanning, by an augmented reality device, an indoor space; receiving, by the augmented reality device, viewing environment information including viewing space information, viewing time information and viewing content information to the augmented reality device; and proposing, by the augmented reality device, an optimal location/type of the display device.

According to another aspect of the present disclosure, there is provided a device for proposing a location of a display device, including: a scan unit which scans an indoor space; an input unit which receives viewing environment information comprising viewing space information, viewing time information and viewing content information; and a proposing unit which proposes an optimal location of a display device and a type of the display device.

The details of one or more embodiments of the subject matter described in this specification are set forth in the accompanying drawings and the description below.

According to the embodiments of the present disclosure, it is possible to convince consumers that a proposed display device has good reflection characteristics.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION

Figure 1:
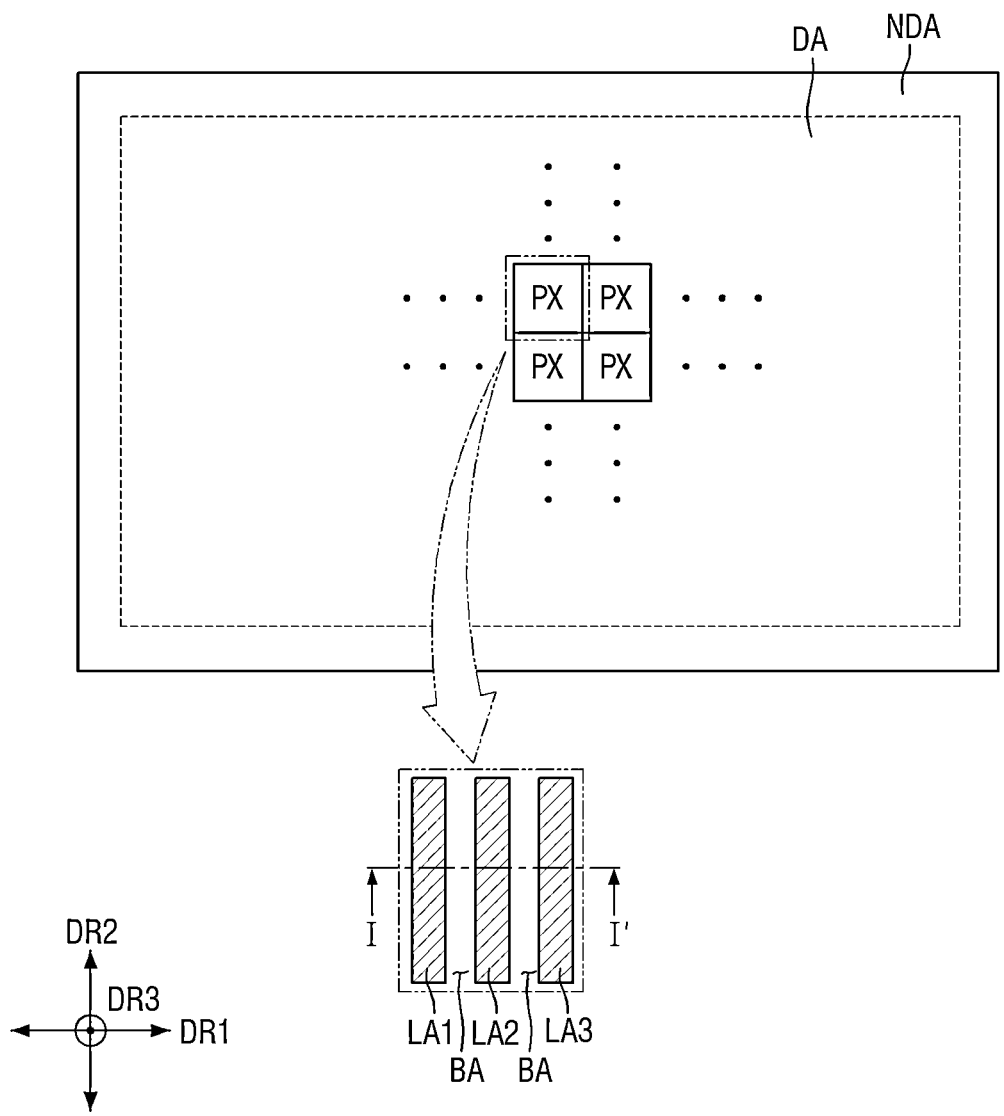
FIG. 1 is a plan view showing an example of a display proposed to a consumer by applying a method of proposing a location of a display device according to an embodiment of the present disclosure.

Specific structural and functional descriptions of embodiments of the invention disclosed herein are only for illustrative purposes of the embodiments of the invention. The invention may be embodied in many different forms without departing from the spirit and significant characteristics of the invention. Therefore, the embodiments of the invention are disclosed only for illustrative purposes and should not be construed as limiting the invention. That is, the invention is only defined by the scope of the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present disclosure will be described in detail with reference to the accompanying drawings.

FIG. 1 is a plan view showing an example of a display device proposed to a consumer by applying a method for proposing a location of a display device according to an embodiment of the present disclosure.

Referring to FIG. 1, the display device proposed to a consumer by applying the method for proposing a location of a display device according to the embodiment of the present disclosure may have a quadrangular shape when viewed from the top (i.e., in a plan view). It is, however, to be understood that the present disclosure is not limited thereto. The shape of the display device when viewed from the top may be a square, a circle, an ellipse, or other polygons in another embodiment. In the following description, it is assumed that the display device has a rectangular shape when viewed from the top.

The display device includes a display panel that provides a display screen. Examples of the display panel may include an inorganic light-emitting diode display panel, an organic light-emitting display panel, a quantum-dot light-emitting display panel, a plasma display panel, a field emission display panel, etc. In the following description, an inorganic light-emitting diode display panel is employed as an example of the display panel, but the present disclosure is not limited thereto. Any other display panel may be employed as long as the technical idea of the present disclosure can be equally applied.

The display device may include a display area DA and a non-display area NDA. The display area DA may include a plurality of pixels PX to display images. The plurality of pixels PX may be arranged in a matrix pattern. The non-display area NDA may be disposed around the display area DA to surround the display area DA, and may display no image. The non-display area NDA may completely surround the display area DA when viewed from the top. The display area DA may be referred to as an active area, while the non-display area NDA may also be referred to as an inactive area. The display area DA may generally occupy the center of the display.

The non-display area NDA may be located on one side and the opposite side in a first direction DR1, and one side and the opposite side in a second direction DR2. It is, however, to be understood that the present disclosure is not limited thereto. The non-display area NDA may be located only on one side and the opposite side in the first direction DR1, or only on one side and the opposite side in the second direction DR2 in another embodiment. Lines or circuit drivers included in the display may be disposed or external devices may be mounted in the non-display area NDA on each of the side.

Referring to the enlarged view of FIG. 1, each of the plurality of pixels PX of the display device may include light-emitting areas LA1, LA2 and LA3 defined by a pixel-defining layer, and may emit light having a predetermined peak wavelength through the light-emitting areas LA1, LA2 and LA3. For example, the display area DA of the display may include first to third light-emitting areas LA1, LA2 and LA3. In each of the first to third light-emitting areas LA1, LA2 and LA3, light generated by light-emitting elements of the display device exits out of the display device.

The first to third light-emitting areas LA1, LA2 and LA3 may emit light having predetermined peak wavelengths to the outside of the display. The first light-emitting area LA1 may emit light of a first color, the second light-emitting area LA2 may emit light of a second color, and the third light-emitting area LA3 may emit light of a third color. For example, the light of the first color may be red light having a peak wavelength in the range of 610 to 650 nanometers (nm), the light of the second color may be green light having a peak wavelength in the range of 510 to 550 nm, and the light of the third color may be blue light having a peak wavelength in the range of 440 to 480 nm. It is, however, to be understood that the present disclosure is not limited thereto.

The display area DA of the display device may include light-blocking areas BA located between the adjacent ones of the light-emitting areas LA1, LA2 and LA3. For example, the light-blocking areas BA between the light-emitting areas may surround the first light-emitting area LA1 to the third light-emitting area LA3.

Figure 2:
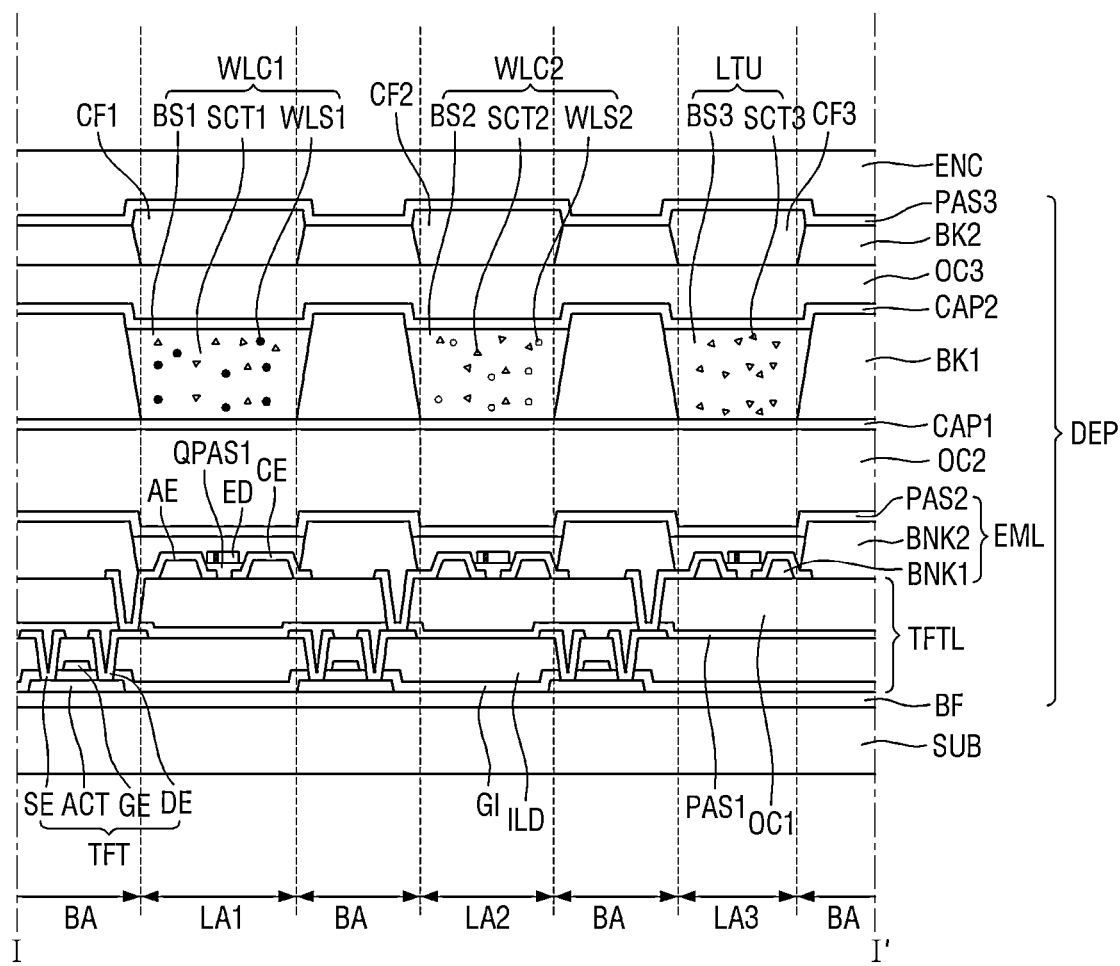
FIG. 2 is a cross-sectional view taken along line I-I' in FIG. 1.

FIG. 2 is a cross-sectional view taken along line I-I' of the enlarged view of FIG. 1.

Referring to FIG. 2, the display device of FIG. 1 may include a substrate SUB disposed across the display area DA and the non-display area NDA, a display element layer DEP on the substrate SUB disposed in the display area DA, and an encapsulation member ENC disposed across the display area DA and the non-display area NDA to encapsulate the display element layer DEP.

The substrate SUB may be made of an insulating material such as a polymer resin. The insulating material may include, but is not limited to, polyimide ("PI"). The first substrate SUB1 and the second substrate SUB2 may include the same material.

The display element layer DEP may include a buffer layer BF, a thin-film transistor layer TFTL, an emission material layer EML, a second planarization layer OC2, a first capping layer CAP1, a first light-blocking member BK1, a first wavelength-converting unit WLC1, a second wavelength-converting unit WLC2, a light-transmitting unit LTU, a second capping layer CAP2, a third planarization layer OC3, a second light-blocking member BK2, first to third color filters CF1, CF2 and CF3, a third passivation layer PAS3, and an encapsulation member ENC.

The buffer layer 120 may be disposed on the substrate 100. The buffer layer BF may be formed of an inorganic film that can prevent the permeation of air or moisture.

The thin film transistor layer TFTL may include a thin film transistor TFT, a gate insulator GI, an interlayer dielectric layer ILD, a first passivation layer PAS1, and a first planarization layer OC1.

The thin-film transistor TFT may be disposed on the buffer layer BF, and may form a pixel circuit of each of a plurality of pixels.

The semiconductor layer ACT may be disposed on the buffer layer BF. The semiconductor layer ACT may overlap the gate electrode GE, the source electrode SE and the drain electrode DE in a plan view. The semiconductor layer ACT may be in direct contact with the source electrode SE and the drain electrode DE, and may face the gate electrode GE with the gate insulator GI therebetween.

The gate electrode GE may be disposed on the gate insulator GI. The gate electrode GE may overlap the semiconductor layer ACT with the gate insulator GI interposed therebetween in a plan view.

The source electrode SE and the drain electrode DE are disposed on the interlayer dielectric layer ILD such that they are spaced apart from each other. The source electrode SE may be in contact with one end of the semiconductor layer ACT through a contact hole formed in the gate insulator GI and the interlayer dielectric layer ILD. The drain electrode DE may be in contact with the other end of the semiconductor layer ACT through a contact hole formed in the gate insulator GI and the interlayer dielectric layer ILD. The drain electrode DE may be connected to a first electrode AE of a light-emitting element EL through a contact hole formed in the first passivation layer PAS1 and the first planarization layer OC1.

The gate insulator GI may be disposed on the semiconductor layer ACT. For example, the gate insulator GI may be disposed on the semiconductor layer ACT and the buffer layer BF, and may insulate the semiconductor layer ACT from the gate electrode GE. The gate insulator GI may include a contact hole penetrating through the source electrode SE and a contact hole penetrating through the drain electrode DE.

The interlayer dielectric layer ILD may be disposed over the gate electrode GE. For example, the interlayer dielectric layer ILD may include the contact hole via which the source electrode SE penetrates, and the contact hole via which the drain electrode DE penetrates.

The first passivation layer PAS1 may be disposed above the thin-film transistor TFT to protect the thin-film transistor TFT. For example, the first passivation layer PAS1 may include a contact hole through which the first electrode AE passes.

The first planarization layer OC1 may be disposed on the first passivation layer PAS1 to provide a flat surface over the thin-film transistor TFT. For example, the first planarization layer OC1 may include a contact hole through which the first electrode AE of the light-emitting element EL passes.

The emission material layer EML may include a light-emitting element EL, a first bank BNK1, a second bank BNK2, a first element insulating layer QPAS1, and a second passivation layer PAS2.

The light-emitting element EL may be disposed on the thin-film transistor TFT. The light-emitting element EL may include a first electrode AE, a second electrode CE, and a light-emitting diode ED.

The first electrode AE may be disposed on the first planarization layer OC1. For example, the first electrode AE may be disposed over the first bank BNK1 disposed on the first planarization layer OC1 to cover the first bank BNK1. The first electrode AE may be disposed to overlap one of the first to third light-emitting areas LA1, LA2 and LA3 defined by the second bank BNK2 in a plan view. The first electrode AE may be connected to the drain electrode DE of the thin-film transistor TFT.

The second electrode CE may be disposed on the first planarization layer OC1. For example, the second electrode CE may be disposed over the first bank BNK1 disposed on the first planarization layer OC1 to cover the first bank BNK1. The second electrode CE may be disposed to overlap one of the first to third light-emitting areas LA1, LA2 and LA3 defined by the second bank BNK2 in a plan view. For example, the second electrode CE may receive a common voltage applied to all pixels.

The first element insulating layer QPAS1 may cover a part of the first electrode AE and a part of the second electrode CE adjacent to each other and may insulate the first and second electrodes AE and CE from each other.

The light-emitting diode ED may be disposed between the first electrode AE and the second electrode CE above the first planarization layer OC1. The light-emitting diode ED may be disposed on the first element insulating layer QPAS1. One end of the light-emitting diode ED may be connected to the first electrode AE, and the other end of the light-emitting diode ED may be connected to the second electrode CE. For example, the plurality of light emitting elements ED may include active layers having the same material so that they may emit light of the same wavelength or light of the same color. The lights emitted from the first to third light-emitting areas LA1, LA2 and LA3, respectively, may have the same color. For example, the plurality of light-emitting diodes ED may emit light of the third color or blue light having a peak wavelength in the range of 440 nm to 480 nm.

The second bank BNK2 may be disposed on the first planarization layer OC1 to define first to third light-emitting areas LA1, LA, and LA3. For example, the second bank BNK2 may surround each of the first to third light-emitting areas LA1, LA2 and LA3. It is, however, to be understood that the present disclosure is not limited thereto. The second bank BNK2 may be disposed in each of the light-blocking areas BA in another embodiment.

The second passivation layer PAS2 may be disposed on the plurality of light-emitting elements EL and the second bank BNK2. The second passivation layer PAS2 may cover the plurality of light-emitting elements EL to protect the plurality of light-emitting elements EL.

The display may further include the second planarization layer OC2, the first capping layer CAP1, the first light-blocking member BK1, the first wavelength converting unit WLC1, the second wavelength converting unit WLC2, the light-transmitting unit LTU, the second capping layer CAP2, the third planarization layer OC3, the second light-blocking member BK2, the first to third color filters CF1, CF2 and CF3, the third passivation layer PAS3, and the encapsulation member ENC.

The second planarization layer OC2 may be disposed on the emission material layer EML to provide a flat surface over the emission material layer EML. The second planarization layer OC2 may include an organic material.

The first capping layer CAP1 may be disposed on the second planarization layer OC2. The first capping layer CAP1 may seal the lower surfaces of the first and second wavelength converting units WLC1 and WLC2 and the light-transmitting unit LTU. The first capping layer CAP1 may include an inorganic material.

The first light-blocking member BK1 may be disposed on the first capping layer CAP1 in the light-blocking area BA. The first light-blocking member BK1 may overlap the second bank BNK2 in the thickness direction (i.e., third direction DR3) in a plan view. The first light-blocking member BK1 can block the transmission of light.

The first light-blocking member BK1 may include an organic light-blocking material and a liquid repellent component.

Since the first light-blocking member BK1 includes the liquid repellent component, the first and second wavelength converting units WLC1 and WLC2 and the light-transmitting unit LTU may be separated so that they can correspond to the respective light-emitting areas LA.

The first wavelength converting unit WLC1 may be disposed in the first emission area LA1 on the first capping layer CAP1. The first wavelength converter WLC1 may be surrounded by the first light blocking member BK1. The first wavelength-converting unit WLC1 may include a first base resin BS1, first scatterers SCT1, and first wavelength shifters WLS1.

The first base resin BS1 may include a material having a relatively high light transmittance. The first base resin BS1 may be made of a transparent organic material. For example, the first base resin BS1 may include at least one organic material among an epoxy resin, an acrylic resin, a cardo resin, and an imide resin.

The first scatterers SCT1 may have a refractive index different from that of the first base resin BS1 and may form an optical interface with the first base resin BS1.

The first wavelength shifters WLS1 may convert or shift the peak wavelength of the incident light to a first peak wavelength. For example, the first wavelength shifters WLS1 may convert blue light provided from the display into red light having a single peak wavelength in the range of 610 nm to 650 nm, and output the light. The first wavelength shifters WLS1 may be quantum dots, quantum rods, or phosphor. The quantum dots may be particulate matter that emits a color as electrons transition from the conduction band to the valence band.

The light output from the first wavelength shifters WLS1 may have a full width of half maximum ("FWHM") of the emission wavelength spectrum of 45 nm or less, 40 nm or less, or 30 nm or less. Accordingly, the color purity and color gamut of the colors displayed by the display can be further improved.

A part of the blue light emitted from the emission material layer EML may pass through the first wavelength-converting unit WLC1 without being converted into red light by the first wavelength shifters WLS1. When such blue light is incident on the first color filter CF1, it can be blocked by the first color filter CF1. On the other hand, red light converted by the first wavelength-converting unit WLC1 may pass through the first color filter CF1 to exit to the outside. Accordingly, the first light-emitting area LA1 may emit red light.

The second wavelength-converting unit WLC2 may be disposed in the second light-emitting area LA2 on the first capping layer CAP1. The second wavelength-converting unit WLC2 may be surrounded by the first light-blocking member BK1. The second wavelength-converting unit WLC2 may include a second base resin BS2, second scatterers SCT2, and second wavelength shifters WLS2.

The second base resin BS2 may include a material having a relatively high light transmittance. The second base resin BS2 may be made of a transparent organic material.

The second scatterers SCT2 may have a refractive index different from that of the second base resin BS2 and may form an optical interface with the second base resin BS2. For example, the second scatterers SCT2 may include a light scattering material or light scattering particles that scatter at least a part of transmitted light.

The second wavelength shifters WLS2 may convert or shift the peak wavelength of the incident light to a second peak wavelength that is different from the first peak wavelength of the first wavelength shifters WLS1. For example, the second wavelength shifters WLS2 may convert blue light provided from the display into green light having a single peak wavelength in the range of 510 nm to 550 nm, and output the light. The second wavelength shifters WLS2 may be quantum dots, quantum rods, or phosphor. The second wavelength shifters WLS2 may include the above-listed materials of the first wavelength shifters WLS1.

The light-transmitting unit LTU may be disposed in the third light-emitting area LA3 on the first capping layer CAP1. The light-transmitting unit LTU may be surrounded by the first light-blocking member BK1. The light-transmitting unit LTU may transmit the incident light without converting its peak wavelength. The light-transmitting unit LTU may include a third base resin BS3 and third scatterers SCT3.

The third base resin BS3 may include a material having a relatively high light transmittance. The third base resin BS3 may be made of a transparent organic material.

The third scatterers SCT3 may have a refractive index different from that of the third base resin BS3 and may form an optical interface with the third base resin BS3. For example, the third scatterers SCT3 may include a light scattering material or light scattering particles that scatter at least a part of transmitted light.

The first and second wavelength converting units WLC1 and WLC2 and the light-transmitting unit LTU are disposed on the emission material layer EML through the second planarization layer OC2 and the first capping layer CAP1.

Therefore, the display device may not require a separate substrate for the first and second wavelength converting units WLC1 and WLC2 and the light-transmitting unit LTU.

The second capping layer CAP2 may cover the first and second wavelength converting units WLC1 and WLC2, the light-transmitting unit LTU, and the first light-blocking member BK1.

The third planarization layer OC3 may be disposed on the second capping layer CAP2 to provide the flat top surfaces of the first and second wavelength converting units WLC1 and WLC2 and the light-transmitting part LTU. The third planarization layer OC3 may include an organic material.

The second light-blocking member BK2 may be disposed on the third planarization layer OC3 in the light-blocking area BA. The second light-blocking member BK2 may overlap the first light-blocking member BK1 or the second bank BNK2 in the thickness direction in a plan view. The second light-blocking member BK2 can block the transmission of light.

The first color filter CF1 may be disposed in the first light-emitting area LA1 on the third planarization layer OC3. The first color filter CF1 may be surrounded by the second light blocking member BK2. The first color filter CF1 may overlap the first wavelength-converting unit WLC1 in the thickness direction in a plan view. The first color filter CF1 may selectively transmit light of the first color (e.g., red light) and may block and absorb light of the second color (e.g., green light) and light of the third color (e.g., blue light).

The second color filter CF2 may be disposed on the third planarization layer OC3 in the second light-emitting area LA2. The second color filter CF2 may be surrounded by the second light-blocking member BK2. The second color filter CF2 may overlap the second wavelength-converting unit WLC2 in the thickness direction in a plan view. The second color filter CF2 may selectively transmit light of the second color (e.g., green light) and may block and absorb light of the first color (e.g., red light) and light of the third color (e.g., blue light).

The third color filter CF3 may be disposed in the third light-emitting area LA3 on the third planarization layer OC3. The third color filter CF3 may be surrounded by the second light-blocking member BK2. The third color filter CF3 may overlap the light-transmitting unit LTU in the thickness direction in a plan view. The third color filter CF3 may selectively transmit light of the third color (e.g., blue light) and may block and absorb light of the first color (e.g., red light) and light of the second color (e.g., green light).

The first to third color filters CF1, CF2 and CF3 may absorb a part of the light introduced from the outside of the display to reduce reflection of external light. Accordingly, the first to third color filters CF1, CF2 and CF3 can prevent color distortion due to reflection of external light.

The third passivation layer PAS3 may cover the first to third color filters CF1, CF2 and CF3. The third passivation layer PAS3 can protect the first to third color filters CF1, CF2 and CF3.

The encapsulation member ENC may be disposed on the third passivation layer PAS3. For example, the encapsulation member ENC may include at least one inorganic layer to prevent permeation of oxygen or moisture. In addition, the encapsulation member ENC may include at least one organic layer to protect the display from particles such as dust.

Hereinafter, a method for proposing a location of the display device described above with reference to FIGS. 1 and 2 will be described.

Figure 3:
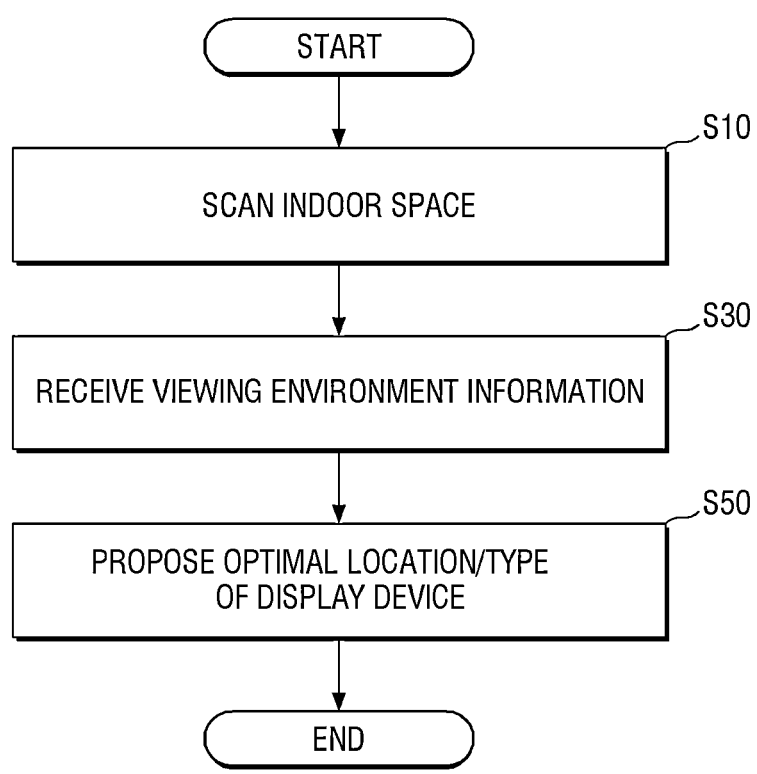
FIG. 3 is a flowchart for illustrating a method for proposing a location of a display device according to an embodiment of the present disclosure.

FIG. 3 is a flowchart for illustrating a method for proposing a location of a display device according to an embodiment of the present disclosure.

Referring to FIG. 3, a method for proposing a location of a display device according to an embodiment of the present disclosure may include scanning, by an augmented reality device, an indoor space (step S10); receiving viewing environment information including viewing space information, viewing time information and viewing content information to the augmented reality device (step S30); and proposing an optimal location/type of the display device (step S50).

More specifically, initially, a user performs scanning an indoor space using an augmented reality device S10.

The augmented reality device may be provided in the form of a mobile terminal. The mobile terminal may include a wireless communication unit, an input unit, a sensing unit, an output unit, an interface unit, a memory, a control unit and a power supply unit.

More specifically, the wireless communication unit among the elements may include at least one module that enables wireless communications between the mobile terminal and a wireless communication system, between the mobile terminal and another mobile terminal, or between the mobile terminal and an external server. In addition, the wireless communication unit may include one or more modules for connecting the mobile terminal with one or more networks.

The wireless communication unit may include at least one of a broadcast reception module, a mobile communication module, a wireless internet module, a near-field communication module, and a location information module.

The input unit may include a camera or a video input unit for inputting a video signal, a microphone or an audio input unit for inputting an audio signal, and a user input unit for receiving information from a user (e.g., a touch key, mechanical key, etc.). Voice data or image data collected by the input unit may be analyzed and processed as a user's control command.

The sensing unit may include one or more sensors for sensing at least one of information in the mobile terminal, information on the environment surrounding the mobile terminal, and user information.

In an embodiment, for example, the sensing unit may include at least one of: a proximity sensor, an illumination sensor, a touch sensor, an acceleration sensor, a magnetic sensor, a gravity sensor (G-sensor), a gyroscope sensor, a motion sensor, a RGB sensor, an infrared sensor ("IR" sensor), a fingerprint scan sensor, an ultrasonic sensor, an optical sensor (e.g., the camera, the microphone, etc.), a battery gauge, an environmental sensor (e.g., a barometer, a hygrometer, a thermometer, a radiation sensor, a thermal sensor, a gas detection sensor, etc.), and a chemical sensor (e.g., an electronic nose, a healthcare sensor, a biometric sensor, etc.). The mobile terminals disclosed herein may combine and utilize information pieces sensed by two or more of such sensors.

The output unit is for generating an output related to visual, auditory or tactile sense, and may include at least one of a display unit, a sound output unit, a haptic module, and an optical output unit. The display unit may implement a touch screen by forming a layer structure with the touch sensor or being formed integrally with the touch sensor. Such a touch screen may function as a user input unit providing an input interface between the mobile terminal and a user, and may provide an output interface between the mobile terminal and the user.

The interface unit serves as a channel for a variety of types of external devices connected to the mobile terminal. The interface unit may include at least one of: a wired/wireless headset port, an external charger port, a wired/wireless data port, a memory card port, a port for connecting to a device including an identity module, an audio input/output ("I/O") port, a video I/O port, and an earphone port. When an external device is connected to the interface unit, appropriate control associated with the connected external device may be carried out in the mobile terminal.

In addition, the memory stores data supporting a variety of features of the mobile terminal. The memory may store a number of application programs (or applications) run in the mobile terminal, data items for operating mobile terminal, and commands. At least some of such application programs may be downloaded from an external server via wireless communications. In addition, at least some of such application programs may exist on the mobile terminal as factory default settings for basic functions (e.g., receiving calls, sending calls, receiving messages, and sending messages) of the mobile terminal. The application programs may be stored in the memory, may be installed on the mobile terminal, and may be driven to perform operations (i.e., functions) of the mobile terminal by the control unit.

In addition to the operations associated with the application programs, the control unit typically controls the overall operation of the mobile terminal. The control unit may provide or process appropriate information or functions to the user by processing signals, data, information, etc. input or output via the above-described elements or by driving an application program stored in the memory.

The power supply unit receives external power and internal power under the control of the control unit to supply power to the elements included in the mobile terminal. The power supply unit includes a battery. The battery may be a built-in battery or a replaceable battery.

Figure 4:
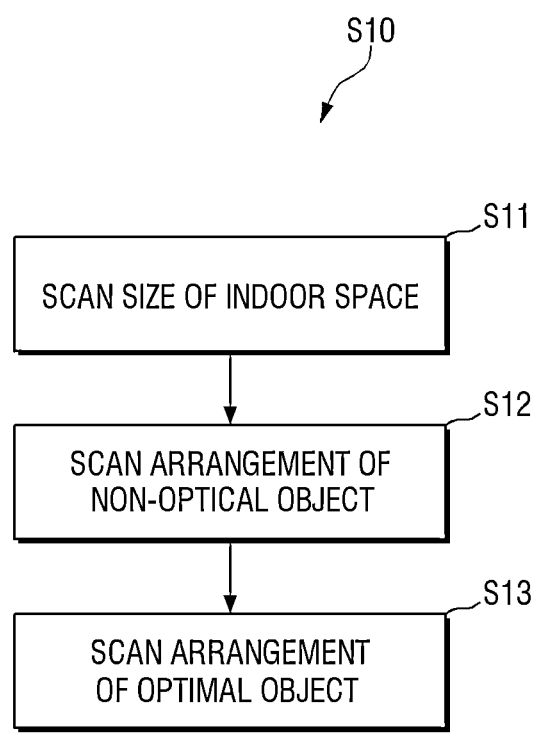
FIG. 4 is a flowchart for illustrating steps of scanning an indoor space of a method for proposing a location of a display device according to an embodiment of the present disclosure.
Figure 5:
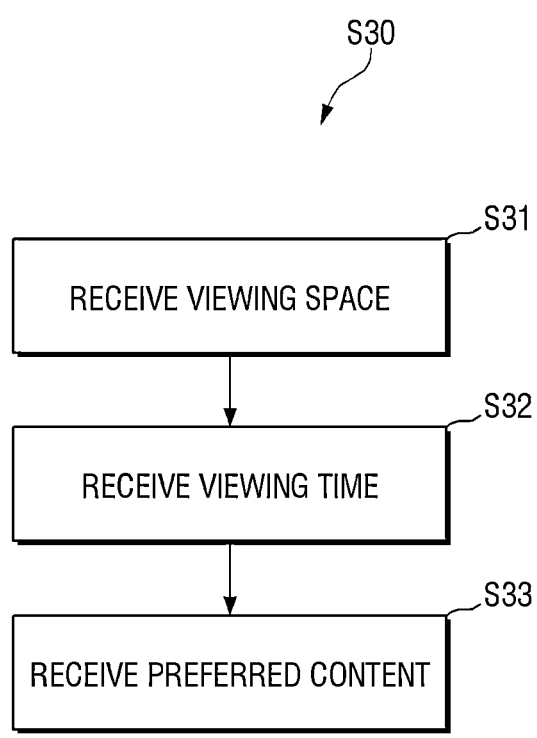
FIG. 5 is a flowchart for illustrating steps of receiving viewing environment information of a method for proposing a location of a display device according to an embodiment of the present disclosure.
Figure 6:
FIG. 6 is an exemplary photograph illustrating the scanning of the indoor space in the method for proposing a location of a display device of FIG. 3.
Figure 7:
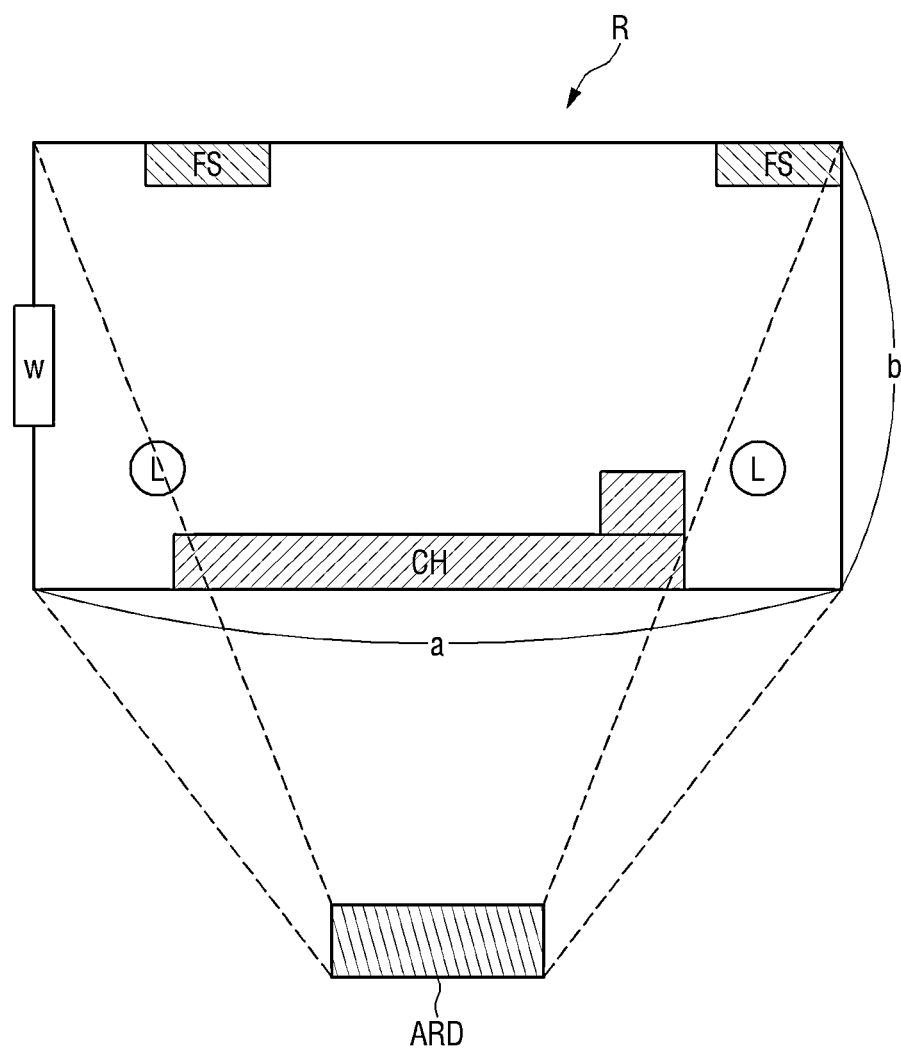
FIG. 7 is a view illustrating the scanning of the size of the indoor space in the method of FIG. 4.
Figure 8:
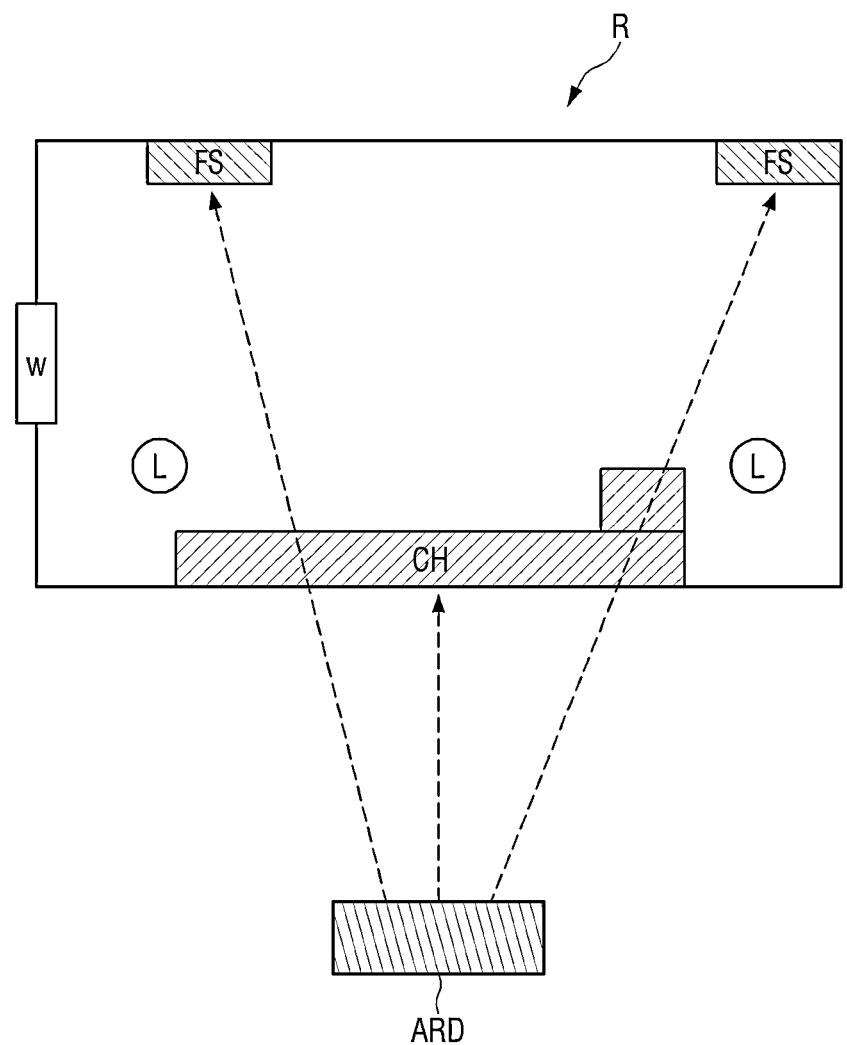
FIG. 8 is a view illustrating the scanning of the arrangement of non-optical object in the method of FIG. 4.
Figure 9:
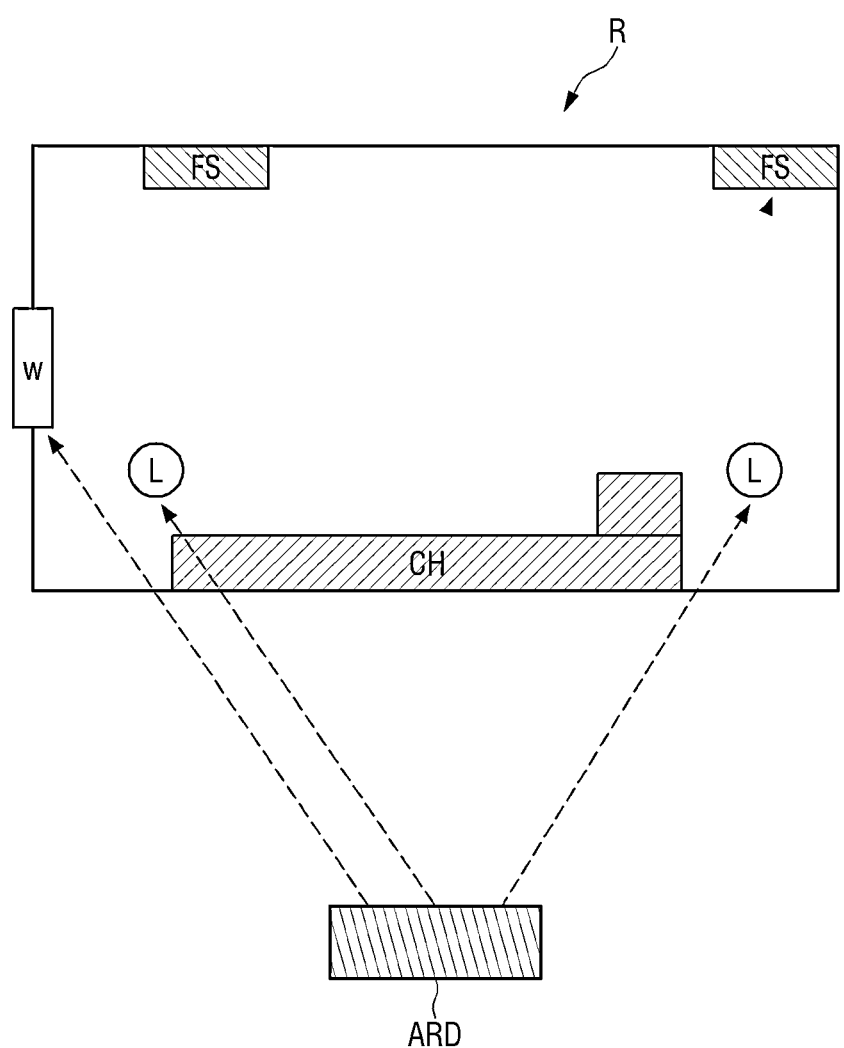
FIG. 9 is a view illustrating the scanning of the arrangement of optical object in the method of FIG. 4.

FIG. 4 is a flowchart for illustrating steps of scanning an indoor space of a method for proposing a location of a display device according to an embodiment of the present disclosure. FIG. 5 is a flowchart for illustrating steps of receiving viewing environment information of a method for proposing a location of a display device according to an embodiment of the present disclosure. FIG. 6 is an exemplary photograph showing the scanning the indoor space in the method for proposing a location of a display device of FIG. 3. FIG. 7 is a view illustrating the scanning the size of the indoor space in the method of FIG. 4. FIG. 8 is a view showing the illustrating the arrangement of non-optical object in the method of FIG. 4. FIG. 9 is a view showing the illustrating the arrangement of optical object in the method of FIG. 4.

Referring to FIGS. 3, 4, 6 and 7, the scanning of the indoor space S10 may include scanning the size of the indoor space (step S11). The scanning of the size of the indoor space S11 may further include scanning the shape of the indoor space. For example, an augmented reality device ARD may scans the indoor space R so that the size of the indoor space R (e.g., width a, depth b) may be measured or calculated.

Referring to FIGS. 3, 4, 6 and 8, the scanning of the indoor space S10 may further include scanning the arrangement of non-optical object in the indoor space (step S12). The non-optical object may include a chair, a sofa CH, or a living room dresser FS.

Referring to FIGS. 3, 4, 6 and 9, the scanning of the indoor space S10 may further include scanning the arrangement of optical object in the indoor space (step S13). The optical object may include a window W through which external light is incident, or luminaire L emitting light.

The optimal location of the display device may be determined based on the arrangement of the non-optical object in the indoor space. Further, the optimal location of the display device may be determined based on the arrangement of the optical object in the indoor space.

Subsequently, referring to FIGS. 3 and 5, after the scanning of the indoor space S10, receiving viewing environment information is performed (step S30).

The receiving of the viewing environment information S30 may include receiving viewing space information (step S31). The viewing space information may include the direction that the house (e.g., the indoor space) faces.

The receiving of the viewing environment information S30 may further include receiving viewing time information (step S32). The viewing time information includes information on day time and night time of the current time.

The receiving of the viewing environment information S30 may further include receiving viewing content information (step S33).

Figure 10:
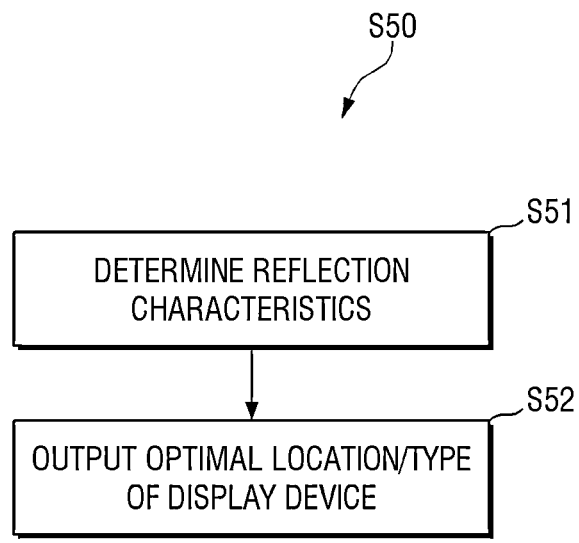
FIG. 10 is a flowchart for illustrating steps of proposing optimal location/type of a display device of a method for proposing a location of a display device according to an embodiment of the present disclosure.
Figure 11:
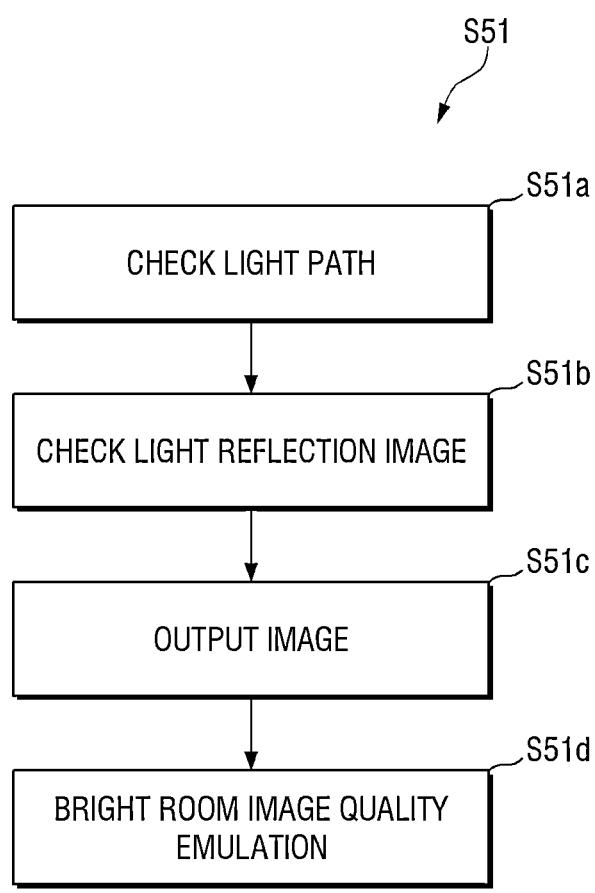
FIG. 11 is a flowchart for illustrating steps of determining reflection characteristics in the steps of FIG. 10.
Figure 12:
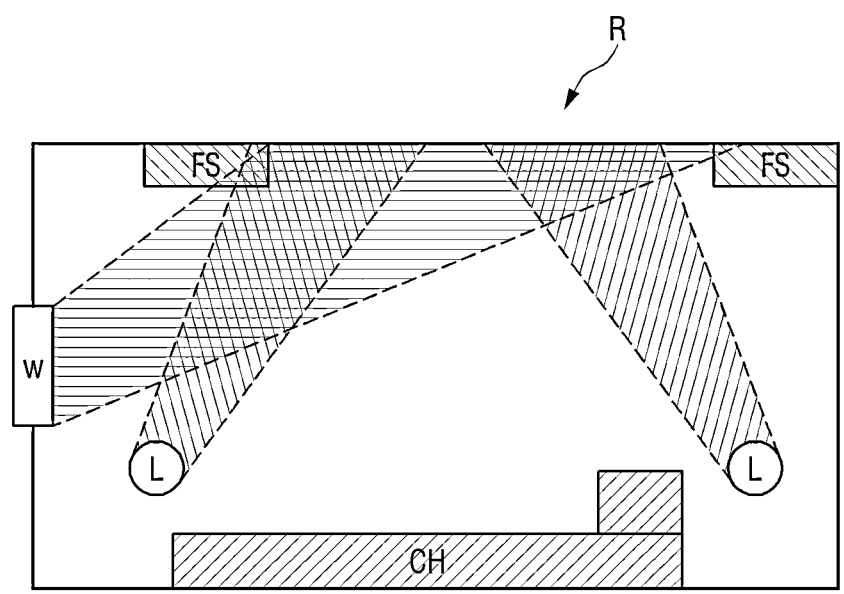
FIG. 12 is a view showing the determining of light paths in the steps of FIG. 11.
Figure 13:
FIG. 13 is an exemplary photograph showing the checking of light reflection on an image in the steps of FIG. 11.
Figure 14:
FIG. 14 is an exemplary photograph showing the outputting of the image in the steps of FIG. 11.
Figure 15:
FIG. 15 is an exemplary photograph showing the emulating an image quality in a bright room of FIG. 11.

FIG. 10 is a flowchart for illustrating steps of proposing optimal location/type of a display device of a method for proposing a location of a display device according to an embodiment of the present disclosure. FIG. 11 is a flowchart for illustrating steps of determining reflection characteristics in the step of FIG. 10. FIG. 12 is a view showing the determining of light paths in the steps of FIG. 11. FIG. 13 is an exemplary photograph showing the checking of light reflection image in the steps of FIG. 11. FIG. 14 is an exemplary photograph showing the outputting of the mage in the steps of FIG. 11. FIG. 15 is an exemplary photograph showing the bright room image quality emulation step of FIG. 11.

Referring to FIG. 10, the proposing of the optimal location/size of the display S50 may include determining reflection characteristics (step S51), and outputting the optimal location and type of the display device (step S52).

As shown in FIGS. 10 to 12, the determining of the reflection characteristics S51 may include determining light paths by the optical object, for example, paths of lights from the window W and the luminaire L in the indoor space R (step S51a).

Subsequently, referring to FIGS. 10, 11 and 13, the determining of the reflection characteristics S51 may include checking light reflection image on the display device based on the determined light paths (step S51b).

The checking of the light reflection image S51b may be carried out when the screen of the display device is turned off. The checking of the light reflection image S51b may be carried out by irradiating the light paths checked in the checking of the light paths S51a to the display device when the screen of the display device is turned off.

Subsequently, referring to FIGS. 10, 11 and 14, the determining of the reflection characteristics S51 may include outputting an image on the screen of the display device (step S51c).

The outputting of the image S51c may be carried out by turning off the light reflection image checked in the checking S51a and outputting the image on the screen of the display.

Subsequently, referring to FIGS. 10, 11 and 15, the determining of the reflection characteristics S51 may include bright room image quality emulation S51d to synthesize the light reflection image checked in the checking S51a and the image on the screen of the display output in the step S51c.

Subsequently, referring to FIG. 10, the outputting of the optimal location and type of the display device S52 is carried out. The outputting of the optimal location and type of the display device S52 may include outputting the optimal location and type of the display device to the user through the output unit of the augmented reality device ARD based on the reflection characteristics determined in the determining of the reflection characteristics S51.

In this manner, by proposing to the user a display product (i.e., display device) that can reduce the deterioration of the image quality of the display device which may be caused by the reflection (e.g., regular reflection or diffuse reflection) of the optical object in a bright room environment, it is possible to convince the user that the proposed display device has good reflection characteristics based on the particular room environment.

Furthermore, by proposing to the user the optimal location of the display device in the bright room environment in consideration of the arrangement of the non-optical object as well as the reflection by the optical object, the user can easily choose the size and shape of the display product.

In addition, the outputting of the optimal location and type of the display device S52 may include guiding the arrangement (or position) change of the optical object based on the reflection of the optical object in the bright room environment, in addition to the location of the display device.

Hereinafter, a device for proposing a location of a display device to operate the method for proposing the location of the display device according to the above-described embodiment will be described.

Figure 16:
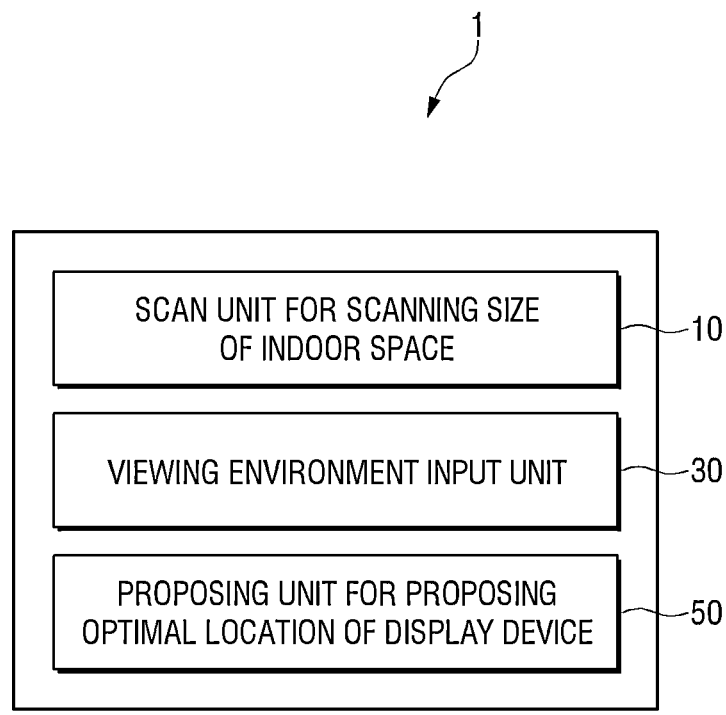
FIG. 16 is a block diagram showing a configuration of a device for proposing a location of a display device according to an embodiment of the present disclosure.

FIG. 16 is a block diagram showing a configuration of a device for proposing a location of a display device according to an embodiment of the present disclosure.

Referring to FIG. 16, a device 1 for proposing a location of a display device according to this embodiment of the present disclosure may include a scan unit 10 configured to scan an indoor space; an input unit 30 configured to allow the user to input viewing environment information comprising viewing space information, viewing time information and viewing content information; and a proposing unit 50 configured to propose an optimal location of a display device and a type of the display device.

The scan unit 10 may include an indoor space size scan unit configured to scan a size of the indoor space, a non-optical object scan unit configured to scan the arrangement of non-optical object in the indoor space, and an optical object scan unit configured to scan the arrangement of optical object in the indoor space.

The input unit 30 may include a viewing space input unit configured to allow the user to input the viewing space information, a viewing time input unit configured to allow the user to input the viewing time information, and a viewing content input unit configured to allow the user to input the viewing content information.

The proposing unit 50 may include a determining unit configured to determine reflection characteristics of the display, and an outputting unit configured to output the optimal location/type of the display device based on determined reflection characteristics. The proposing unit 50 may be implemented by a microprocessor, circuits, or software.

Also according to this embodiment of the present disclosure, by proposing to the user a display product that can reduce the deterioration of the image quality of the display due to the reflection (e.g., regular reflection or diffuse reflection) of the optical object in a bright room environment, it is possible to deliver the logic that the reflection visibility of the proposed display product is good to the user.

Furthermore, by proposing to the user the optimal location of the display product in the bright room environment in consideration of the arrangement of the non-optical object as well as the reflection by the optical object, the user can easily choose the size and shape of the display product.

Further, in addition to the location of a display product, it is possible to guide the arrangement (or position) change of the optical object based on the reflection by the optical object in a bright room environment.

Although embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for proposing a location of a display device, the method comprising:
    scanning, by an augmented reality device, an indoor space;
    receiving, by the augmented reality device, viewing environment information comprising viewing space information, viewing time information and viewing content information; and
    proposing, by the augmented reality device, an optimal location of a display device and a type of the display device,
    wherein the proposing of the optimal location of the display device and the type of the display device comprises determining reflection characteristics of the display device,
    wherein the determining of the reflection characteristics comprises determining a light path by the optical object, checking a light reflection image on the display device based on the determined light path, and outputting in image on a screen of the display device, and synthesizing the light reflection image with the image displayed on the screen of the display device to emulate an image quality in a bright room.

2. The method of claim 1, wherein the scanning of the indoor space comprises scanning a size of the indoor space.

3. The method of claim 2, wherein the scanning of the size of the indoor space comprises scanning a shape of the indoor space.

4. The method of claim 2, wherein the scanning of the indoor space further comprises scanning arrangement of non-optical object in the indoor space.

5. The method of claim 4, wherein the non-optical object comprises a chair, a sofa, or a living room dresser.

6. The method of claim 4, wherein the scanning the indoor space further comprises scanning arrangement of optical object in the indoor space.

7. The method of claim 6, wherein the optical object comprises a window through which external light is incident, or luminaire which emits light.

8. The method of claim 6, wherein the optimal location of the display device is determined based on the arrangement of the non-optical object in the indoor space.

9. The method of claim 8, wherein the optimal location of the display device is determined based on the arrangement of the optical object in the indoor space.

10. The method of claim 6, wherein the receiving of the viewing environment information comprises receiving the viewing space information.

11. The method of claim 10, wherein the viewing space information comprises a direction which the indoor space faces.

12. The method of claim 10, wherein the receiving of the viewing environment information further comprises receiving the viewing time information.

13. The method of claim 12, wherein the viewing time information comprises information on day time and night time.

14. The method of claim 12, wherein the receiving of the viewing environment information further comprises receiving the viewing content information.

15. The method of claim 6, wherein the proposing of the optimal location of the display device and the type of the display device further comprises outputting the optimal location of the display device and the type of the display device to the augmented reality device based on determined reflection characteristics.

16. A device of proposing a location of a display device, comprising:
    a scan unit which scans an indoor space;
    an input unit which receives viewing environment information comprising viewing space information, viewing time information and viewing content information; and
    a proposing unit which proposes an optimal location of a display device and a type of the display device,
    wherein the proposing unit comprises a determining unit which determines reflection characteristics of the display device, and
    the determining unit determines the reflection characteristics of the display device by determining a light path by the optical object, checking a light reflection image on the display device based on the determined light path, and outputting in image on a screen of the display device, and synthesizing the light reflection image with the image displayed on the screen of the display device to emulate an image quality in a bright room.

17. The device of claim 16, wherein the scan unit comprises an indoor space size scan unit which scans a size of the indoor space, a non-optical object scan unit which scans arrangement of non-optical object in the indoor space, and an optical object scan unit which scans arrangement of optical object in the indoor space.

18. The device of claim 17, wherein the input unit comprises a viewing space input unit which receives the viewing space information, a viewing time input unit which receives the viewing time information, and a viewing content input unit which receives the viewing content information.

19. The device of claim 18, wherein the proposing unit further comprises an outputting unit which outputs the optimal location and the type of the display device based on determined reflection characteristics.

* * * * *